May 14, 1929.  F. G. THANNHAUSER  1,712,945
INTERNAL COMBUSTION ENGINE
Filed Dec. 23, 1925   6 Sheets-Sheet 6
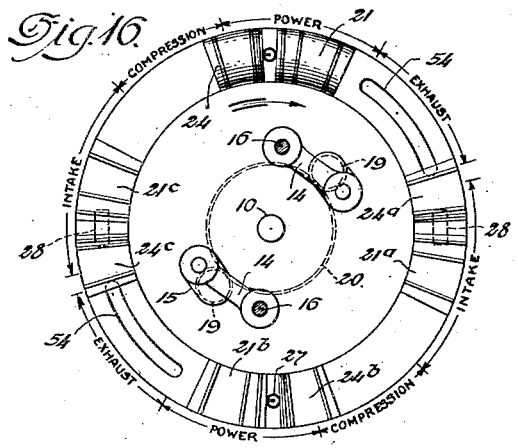
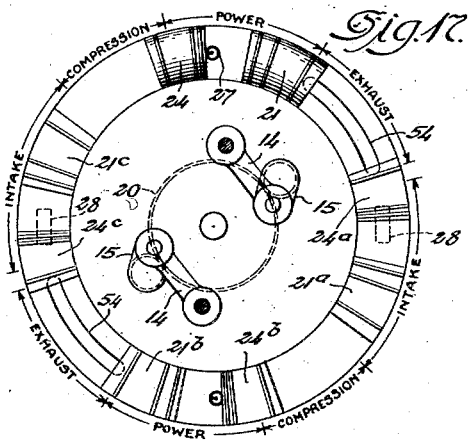
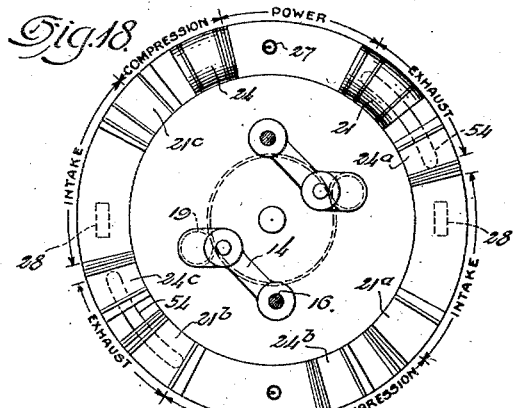
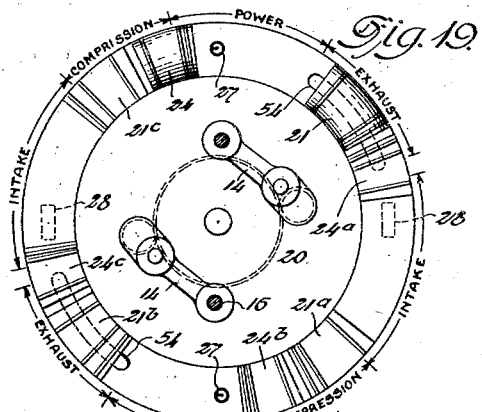
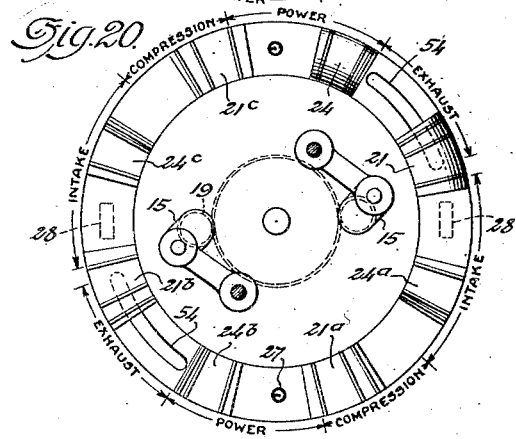
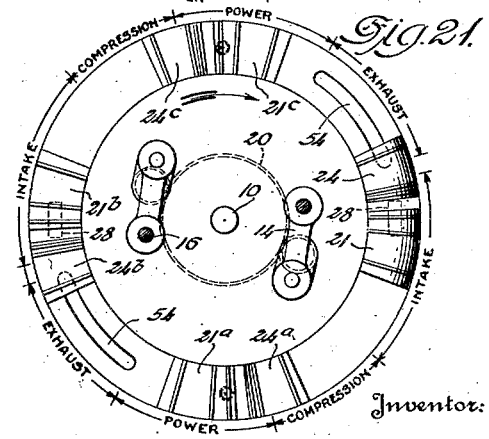
Inventor:
Fred G. Thannhauser
By
Attorneys.

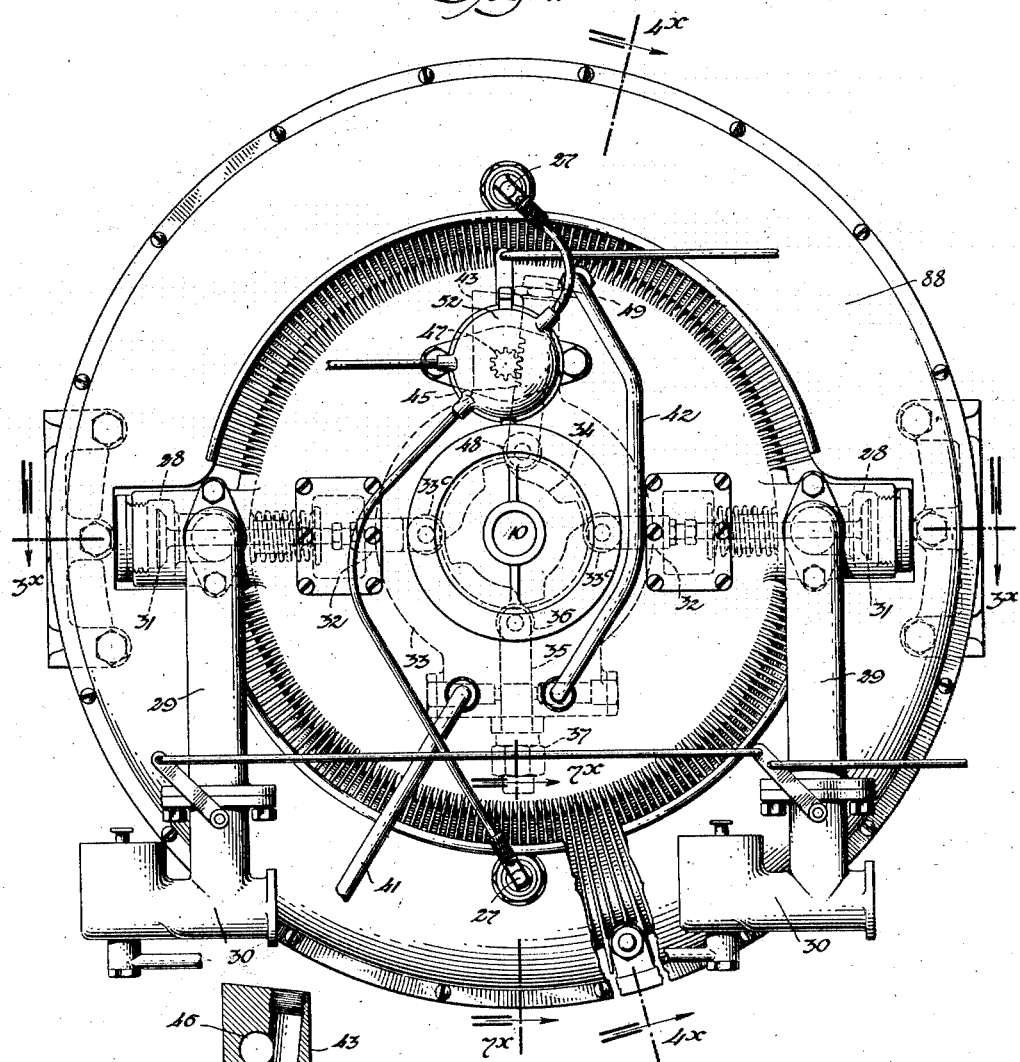

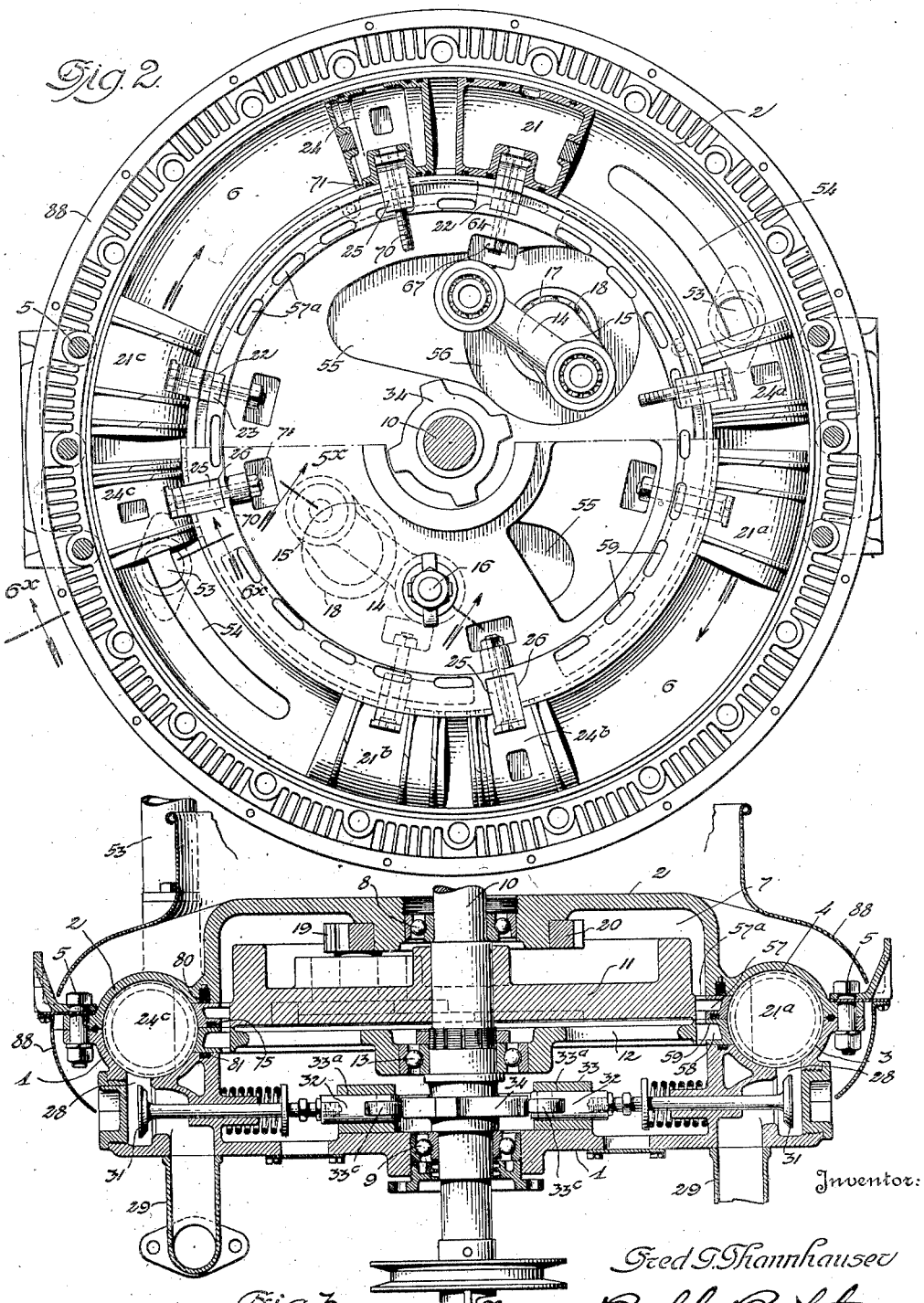

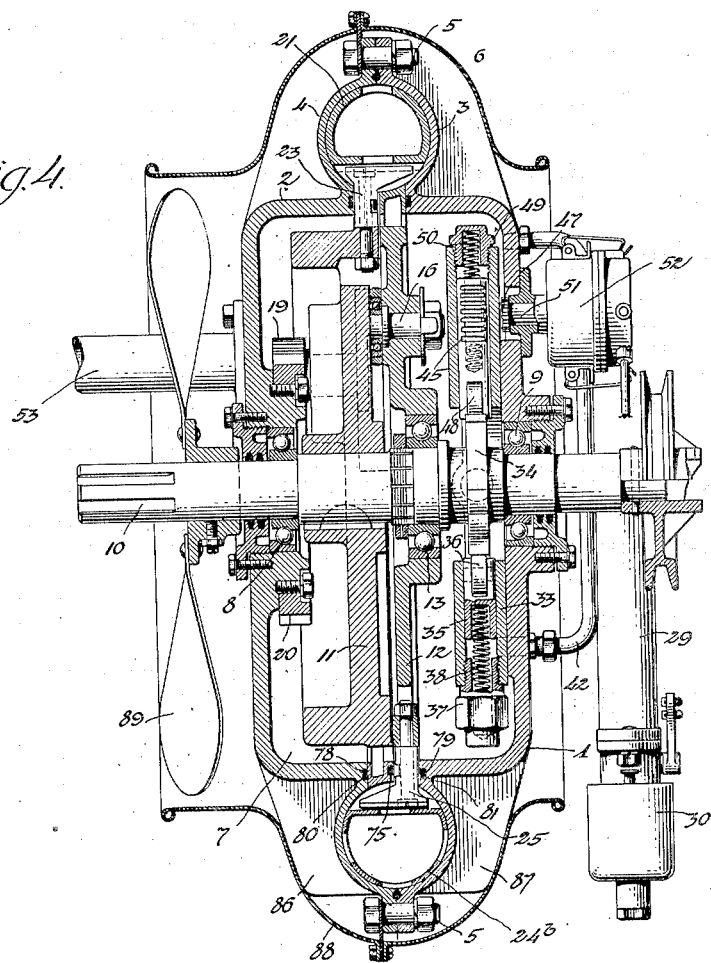
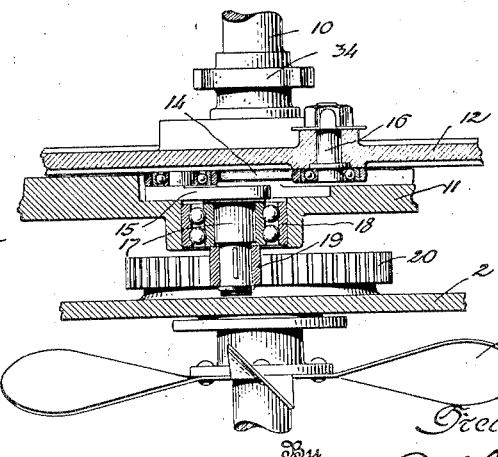

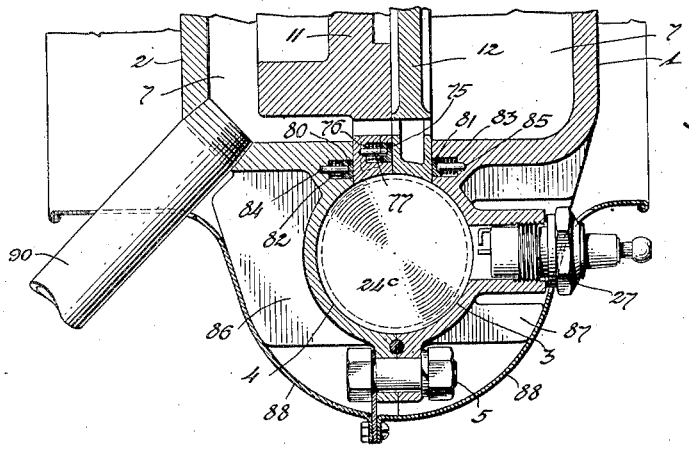
Fig. 7.
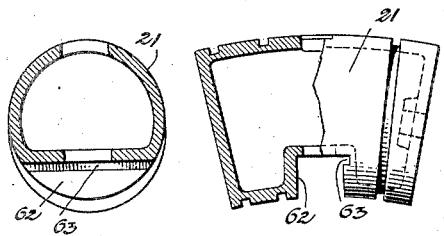
Fig. 9.
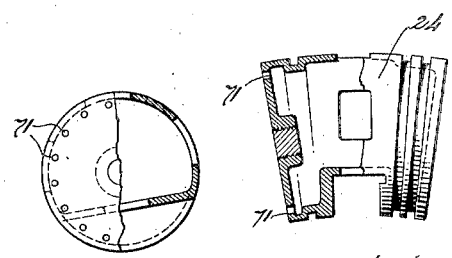
Fig. 10.
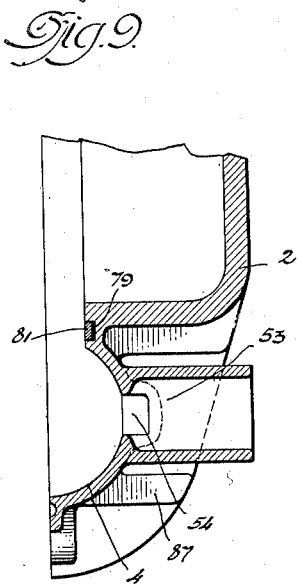
Fig. 6.
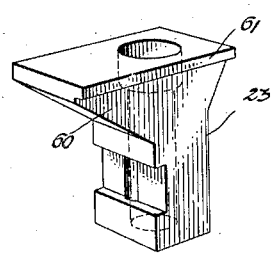
Fig. 15.
Fig. 13.
Inventor:
Fred G. Thannhauser
By
Attorneys.

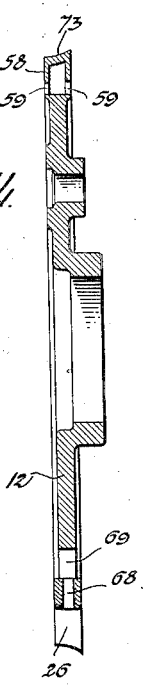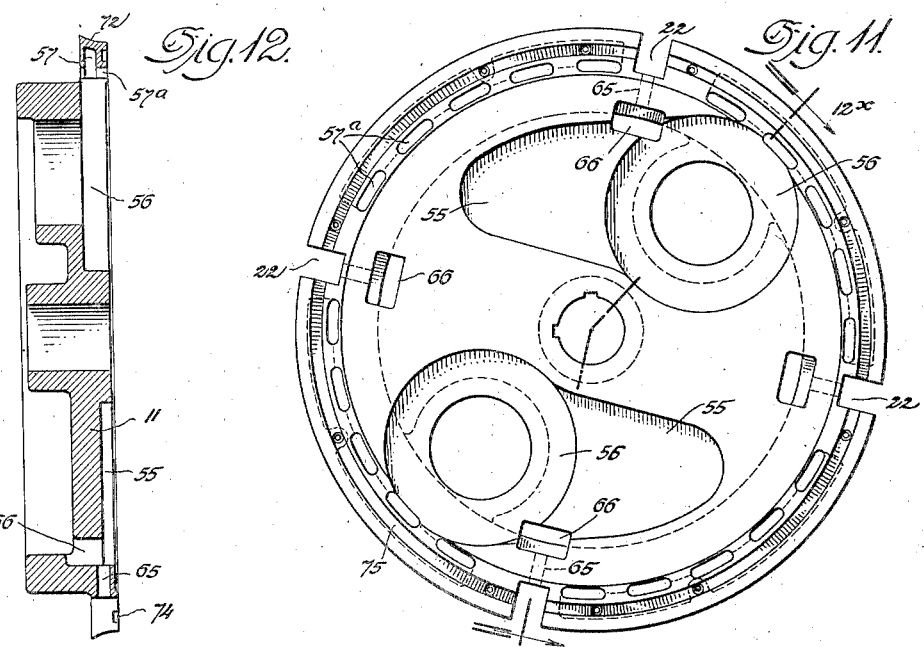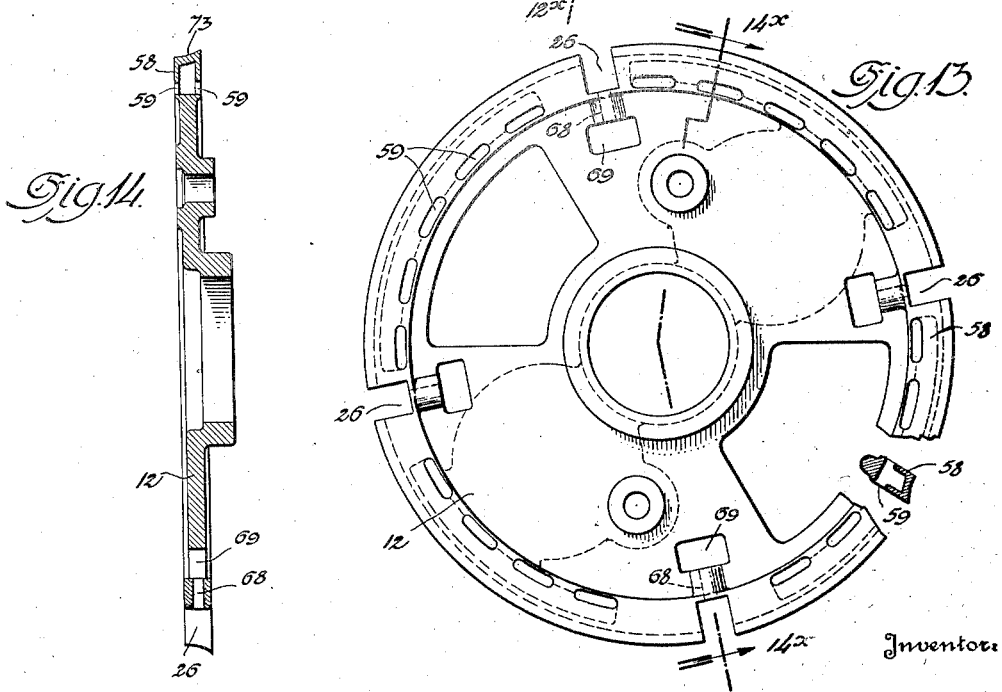

Patented May 14, 1929.

1,712,945

UNITED STATES PATENT OFFICE.

FRED G. THANNHAUSER, OF DETROIT, MICHIGAN.

INTERNAL-COMBUSTION ENGINE.

Application filed December 23, 1925. Serial No. 77,412.

This invention relates to internal combustion engines of the rotary piston type wherein the pistons are carried by and rotate with a rotary power shaft, transmitting power directly thereto instead of through the medium of cranks and connecting rods or equivalent mechanical motion translating means.

In many attempts to devise engines of this type considerable difficulty has usually been met with in providing for efficient intake and compression of explosive gases in the cylinders and attempts to meet this problem have generally contemplated the use of gas compressing means exterior to the cylinders and the admission of pre-compressed gas to the said cylinders.

By my invention I provide a piston system wherein the power pistons move continuously in a constant direction and wherein provision is made for varying the combustion space behind such pistons in a simple and effective manner.

The invention also aims to provide means whereby a four cycle operation may be obtained in an engine having power pistons moving in one direction around the axis of a power shaft; and, further, to obtain a plurality of such cycles during each revolution of said pistons.

A further object of the invention is to provide for the utilizing of a single toroidal cylinder for the housing of a plurality of continuously movable pistons therein and to provide for the application of explosive forces to said pistons by the alternate compressing and exploding of gases behind each piston as it moves beyond certain points whereby its continued movement around the said toroidal cylinder is maintained.

Still further the said invention proposes to provide an internal combustion engine with a toroidal cylinder wherein are arranged pairs of pistons, each pair including a power piston operating a rotary power shaft, and a head piston adapted to alternately recede from and approach said power piston in a relative manner, to provide a variable combustion chamber between the said head and power pistons and result in suction, compression, expansion and exhaust functions in the said combustion chambers.

The invention also contemplates a balanced arrangement of the rotating parts with substantial freedom from complicated mechanisms in securing a four cycle effect in such engine, and also the obtaining of an even torque in the operation of said engine.

Still further objects subsidiary to or resulting from the aforesaid objects, or from the construction or operation of the invention as it may be carried into effect, will become apparent as the said invention is hereinafter further disclosed.

In carrying the said invention into effect, I may provide an engine casing of a generally circular form, having a toroidal cylinder therein in which a plurality of pistons are adapted to travel in a circular path about the axis of the engine casing, these pistons being mounted on a disk which is in turn mounted upon a power shaft extending axially of the said casing so that the said pistons rotate in one with the said power shaft.

Behind each of the said pistons is arranged a further piston hereinafter called the head piston also movable around the said toroidal cylinder and carried by a further disk rotatable on the said shaft and coupled to the shaft disk by means of cranks and connecting rods, which cranks are operable by planetary pinions engaging a fixed sun gear carried by the said casing, in such manner that the rotation of the first mentioned disk results in the operation of the said crank and causes the connecting rod to impart a variable rotary movement to the other disk, whereby during the rotation of the power pistons the head pistons alternately recede from and approach the said power pistons, varying the space therebetween.

Firing means are provided at diametrically opposite points in said cylinder and valve controlled inlet ports, also at diametrically opposite points, intermediate said spark plugs, as well as valveless exhaust ports in the cylinder wall approaching said inlet ports; the operation of said cranks being so related to the positions of said spark plugs and ports that, as each pair of power and head pistons passes beyond the inlet port their relative spacing is increased, causing suction therebetween, following which said cranks reduce such spacing causing compression as the said pistons approach said spark plugs. The firing is effected by suitably timed means and the pistons then again separate as they approach the exhaust ports, under the explosive influence, the space therebetween being then again reduced for the exhausting of the production of combustion through such exhaust ports.

All of which is more particularly described and ascertained hereinafter by way of example in and by the following description of the accompanying drawings, wherein—

Figure 1 is an elevation of an internal combustion engine constructed in accordance with this invention, part of the casing being broken away;

Figure 2 is an elevation partly in section of the same with the inlet side of the casing removed, together with the parts carried thereby and the upper part of the head piston disk cut away;

Figure 3 is a horizontal section of the engine taken on the line 3x—3x, Figure 1;

Figure 4 is a sectional view of the engine taken on the line 4x—4x, Figure 1;

Figure 5 is a fragmentary detail sectional view taken on the line 5x—5x, Figure 2;

Figure 6 is a fragmentary sectional view taken on the line 6x—6x, Figure 2;

Figure 7 is a fragmentary sectional view taken on the line 7x—7x, Figure 1;

Figure 8 is a detail view in section of the oil pump and tappet housing;

Figure 9 illustrates in transverse section and in elevation partly in section one of the power pistons;

Figure 10 illustrates an end view partly in section and in side elevation partly in section of one of the head pistons;

Figure 11 is an elevation of the power disk;

Figure 12 is a sectional view of the same taken on the line 12x—12x, Figure 11;

Figure 13 is an elevation of the head piston disk partly broken away to indicate a rim section;

Figure 14 is a transverse section of the same taken on the line 14x—14x, Figure 13;

Figure 15 is a detail perspective view of one of the piston connecting members;

Figure 15a is a broken perspective view of one of the connecting member securing bolts, and Figures 16, 17, 18, 19, 20 and 21 illustrate diagrammatically the cycle of operation of the engine pistons.

Similar characters of reference indicate similar parts in the several figures of the drawings.

The engine casing or cylinder block is shown as comprising front and back castings 1 and 2, each formed with an annular channel of semi-circular cross section 3 and 4 respectively, forming, when the members 1 and 2 are secured together as by bolts 5, a toroidal cylinder 6, the said members being also of such configuration that their inner portions form a chamber 7 which is in a general way analogous to the crank case of an engine, and the said members 1 and 2 are provided with axially aligned central bearings 8 and 9 in which is journaled the main or driving shaft 10 of the engine.

Within the casing 8 are two disks 11 and 12, the first of which I term the power disk, is keyed to the main shaft 10 and the other disk 12 which I term the head disk, is rotatably mounted on the said main shaft and is provided with a ball bearing 13 to reduce friction between the said disk 12 and the said shaft, the two disks however being coupled together by links 14 connecting cranks 15 carried by the power disk to pins 16 carried by the head disk. The shafts 17 of these cranks extend through bearings 18 in the power disk and have planetary pinions 19 mounted on their outer ends, which pinions are meshed with a sun gear 20 fixedly carried within the member 2 of the engine casing, so that rotation of the casing relative to the said power disk results in rotation of the crank shafts 17 at a ratio in this case of four to one.

Within the said cylinder 6 are equi-distantly arranged four pistons 21, 21a, 21b, and 21c, and the power disk is peripherally recessed at 22 for the reception of connecting members 23, securing the said pistons to the said disk, the form of the said connecting members and their method of attachment being further described hereinafter.

Other pistons which I refer to as head pistons 24, 24a, 24b and 24c are also equi-distantly housed in the cylinder 6 and interposed between the power pistons, these head pistons being attached to the head disk 12 by connecting members 25 entering recesses 26 in the periphery of the said head disk in similar manner to the connecting members 23 of the power pistons. Both the power pistons and the head pistons are capable of circular movement along the toroidal cylinder 6, and it will be obvious that such movement of the power pistons will result in rotation of the power disk 11 and of the main shaft 10.

It will be further seen that such rotation of the power disk results in the planetary movement of the pinions 19 around the sun gear 20, with resultant rotation of the cranks 15, and that this will further result in the connecting links 14 imparting a rotary motion to the head disk 12 of an intermittent nature which determines the movement of the head pistons 24, 24a, 24b and 24c with respect to the movement of the power pistons, whereby the spacing between the power pistons and the head pistons varies as the power pistons travel around the cylinder. In the illustrated construction, by reason of the ratio between the sun gear and its pinions, the head pistons assume their closest position relative to the power pistons four times in the course of each complete revolution of the power disk. This position of closest approach is clearly illustrated in Figures 2 and 16 of the drawings, and the said relative movement of the power and head pistons will be described in greater detail hereinafter in explaining the operation of the engine.

At diametrically opposite points in the cylinder are arranged spark plugs 27, and also at diametrically opposite points in the cylinder but intermediate of the said spark plugs are inlet ports 28 through which intake gases may be admitted to the cylinder through carburettor connections 29 from carburettors 30. 31 are inlet valves controlling such admission of intake gases, the said inlet valves being operated by tappets 32 extending in opposite radial directions from a housing 33 located within the member 1 of the engine casing, which tappets are provided with rollers 33$^c$ and are operable by a quadruply cammed member 34 mounted upon the main shaft within said chamber 7 of the engine. The said housing is shown as being radially bored at 33$^a$ for the reception of the said tappets.

The housing 33 also includes a downwardly extending bore 33$^b$ adapted to form an oil pump cylinder in the upper end of which is a plunger 35 provided at its outer end with a roller 36, and 37 is a plug closing the lower end of the oil cylinder 33$^b$ and forming an abutment for a compression spring 38 within the said oil cylinder, which spring maintains an upward pressure on the plunger 35 to ensure yielding contact of the said roller 36 with the cammed member.

39 and 40 are inlet and outlet valves of the oil pump, the operation of which will be obvious without further description, 41 being an oil feed pipe to the inlet valve through the engine casing, and 42 an oil delivery pipe from the outlet valve to the upper part of the chamber 7.

The upper part of the housing 33 is also provided with an extension 43 radially bored at 44 from the axis of the housing for the accommodation of a rack 45 and transversely bored at 46 for the accommodation of a pinion 47 engaging the said rack. 48 is a roller carried by the lower end of the rack, and 49 a cap on the upper end of the extension 43 enclosing a compression spring 50 which maintains the roller of the said rack in contact with the cammed member. The said pinion 47 is mounted on the shaft 51 of a distributor 52 timing the supply of current to the spark plugs 27, so that it will be seen that the cammed member 34 effects the operation of the inlet and outlet valves, the oil pump, and the distributor of the engine, in this case simultaneously, although of course it is only required that the cammed member be designed to effect these operations in such relation to one another as may be required or desirable for the securing of a desired operation of the engine.

It will be noted that there are no exhaust valves in the engine, the cylinder being provided with exhaust pipes 53 with which exhaust ports 54 communicate, the said exhaust ports being in the form of elongated grooves extending along the cylinder wall and approaching the proximity of the inlet ports 28; and, in the example, the said inlet ports are indicated as being provided in the casting 1 of the cylinder and the exhaust ports in the other casting 2 thereof, so that the inlet and exhaust ports are on opposite sides of the cylinder, which is a convenient arrangement. It will also be understood that the exhaust ports are in advance of the inlet ports in relation to the direction of rotation of the pistons about the axis of the engine, which is clockwise in the present example.

In describing the operation of the engine, attention is directed to Figures 16 to 21 of the drawings, the first of which figures shows the head and power pistons in their positions of near approach to one another, and it will be obvious that if in this position a charge of explosive mixture is compressed between the power and head pistons 21 and 24 and also 21$^b$ and 24$^b$, the exploding of such mixture by the spark plugs 17 and 27 will tend to force the power pistons and head pistons apart, as indicated in Figure 17 wherein the power pistons are shown as having moved forwardly in the cylinder to some extent under the influence of such explosive impulses, which motion is transmitted through the power disk 11 to the main shaft 10 and also results in the rotation of the pinions 19 around the sun gear 20.

An examination of the said Figure 17 will reveal the fact that although the power disk 11 and cranks 15 have been rotated to some extent by this movement of the power pistons, the head disk 12 has remained practically stationary due to the fact that the forward travel of the pinions 19 is practically equal to the opposite movement of the cranks 15 as they approach the axis of the engine, and in Figure 18 the further movement of the power pistons continuing under the explosive impulses has resulted in a rearward or counter-clockwise movement of the head disk 12, and incidentally of the head pistons, due to the fact that the rearward movement of the cranks 15 exceeds the forward movement of the pinions 19 as the said cranks pass between the axes of the said pinions and the axis of the engine. This condition of reverse movement between the power and head disks continues until the said cranks 15 and the connecting links 14 approach alignment, as indicated in Figure 19 which shows the power pistons and head pistons at approximately their greatest relative spacing, whereupon the forward movement of the head disk begins to take place due to the forward throw of the cranks.

These operations are of course descriptive of all of the power and head pistons of the engine, and it will be quite apparent that as the power of the explosions referred to causes the separation of the power pistons 21 and 21$^b$ from the head pistons 24 and 24$^b$ respectively, the incidental separation of the power pistons 21$^a$ and 21$^c$ from the head pistons 24$^a$ and 24$^c$ will result in charges of explosive mixture being induced through the inlet ports 28 due to the fact that the power stroke of the said pistons 21 and 21$^b$ results in the suction stroke of the power pistons 21$^a$ and 21$^c$.

At the beginning of the operation described, the cammed member 34 has effected the opening of the inlet valves and the operation of the distributor as required, the said inlet valves reclosing when the ports assume approximately the positions shown in Figure 19 wherein the suction stroke of the power pistons 21$^a$ and 21$^c$ is completed.

Referring now to Figure 20, it will be noted that the power pistons still travelling forward at constant speed, the cranks 15 are performing their outward throw which results in an accelerated forward motion of the head disks and of the head pistons so that the head pistons are now gaining upon the power pistons and reducing the space between the said head pistons and the said power pistons; and as the power pistons 21 and 21$^b$ have now passed beyond the beginning of the exhaust ports 54, this accelerated movement of the head pistons 21 and 21$^b$ effects the exhausting of the products of combustion from between them and the power pistons in advance thereof.

At the same time the approach of the head pistons 24$^a$ and 24$^c$ towards the power pistons 21$^a$ and 21$^c$ results in a compression of the explosive charge therebetween, this accelerated movement of the head pistons continuing until they have assumed their closest approach to their respective power pistons, as indicated in Figure 21, whereupon complete exhaust and compression strokes as described have taken place, the final position being that indicated in Figure 16, except that all of the pistons have now completed a quarter travel of the cylinder and that the head pistons 21$^c$ and 24$^c$ have assumed the positions of the pistons 21 and 24 indicated in the said Figure 16 and the explosive charge therebetween is about to be fired.

It is preferred that the head disk and its pistons be as light as possible while the power disk and its pistons may be comparatively heavy. As shown in Figures 11 and 12 the power disk is of substantial weight and is provided with recesses 55 for the accommodation of the connecting links 14 and deeper circular recesses 56 for the accommodation of the cranks 15, the said power disk having a hollow rim 57 provided with vent openings 57$^a$ admitting of the circulation of oil therethrough, so that such oil may act as a cooling agent on the peripheral portions of the disk, and also to permit of oil gaining access to the chamber 7 on both sides of the disks. The head disk 12 is also provided with a hollow rim 58 and vents 59 for similar purposes.

The method of attachment of each power piston to the disk 11 is by means of a connecting member 23 having an enlarged upper end 60 provided with a lateral lip 61, the said piston being provided with a recess 62 on the inner side thereof for the reception of the upper end of the connecting member and a further recess 63 receiving the lip 61, whereby the connecting member may be attached to the piston by a sliding movement transversely of the piston; and further securing of the connecting member in its recess in the power disk I provide tubular bolts 64, Figure 2, the ends of which are adapted to pass through radial holes 65 in the said disk into orifices 66 provided for the accommodation of securing nuts 67. These tubular bolts also afford vents for the interior of the piston when it is hollow as may be desirable.

The connecting members 25 of the head pistons are similar to the connecting members 24 and the head disk 12 is similarly provided with radial holes 68 and orifices 69 for the accommodation of the securing bolts 70 and nuts 71 of the head disk and piston assembly, and the head pistons are hollow and have their rear ends perforated as at 71 so that communication is established through the said perforations and bore 70$^a$ of the tubular bolts 70 between the chamber 7 and the spaces between the head piston and the power pistons following such head pistons, it being understood that this spacing varies inversely as the spacing between the head pistons and their respective power pistons varies, and consequently provision must be made for the passage of fluid to and from such space to prevent the building up of compressions or the formation of vacuums therein.

Although the annular channels of the castings 1 and 2 are referred to as being of semi-circular cross section, they are not completely so, as the walls of the members 1 and 2 do not meet on the inner periphery of the cylinder but are substantially spaced apart to receive the rims 57 and 58 of the power and head disks, which rims have arcuately beveled peripheries 72 and 73 respectively conforming to the curvature of the cylinder and when in position completing the cylinder wall. The axes of the pistons are also curved to agree with the curvature of the axis of the cylinder as will be quite apparent.

The rims of the power and head disks meet in a plane common with the curved axis of the cylinder, and the parts of the connecting members 22 and 25 which engage the said disks are offset relative to the upper parts of the said connecting members to agree with the respective positions of the said power and head disks on each side of the said plane.

The rim of one or other of the said disks, in this case the head disk 11 may be provided with an annular recess 74 for the accommodation of a compression ring 75 if necessary or desirable, to prevent leakage from the cylinder between the two disks, and as indicated in Figure 7, I may house springs or similar resilient means 76 in the said rim for the purpose of forcing the compression ring against the rim of the opposed disk, and 77 indicate guide pins or dowels preventing the rotation of the compression ring in its groove. Similarly the faces of the castings 1 and 2 between which the rims of the said disks are received may be annularly recessed as at 78 and 79 for the reception of compression rings 80 and 81 equipped with springs 82 and 83 and dowel pins 84 and 85 in the same manner as the said compression ring 75.

Any suitable cooling system may be adopted, and in the example I show the cylinder as being provided with external heat radiating fins 86 and 87 partially enclosed by a sheet metal housing 88 through which air is circulated by a fan 89 mounted on the shaft 10 of the engine.

An outstanding feature of this engine is the great freedom from complicated gearing and multiplicity of parts in providing for the four cycle effect, and the balanced nature of the rotating parts; and it should also be noted that there is no centrifugal effect of the pistons upon the cylinder wall due to their positive attachment to their respective disks, so that the absence of free forces creating pressure of the pistons upon the walls of the cylinder in any direction results in great freedom from wear such as results in the distortion of the bores of the cylinders of ordinary reciprocating engines.

The power pistons and the heavy rim 11' formed on their supporting disk 11 rotating continuously in one direction act as a flywheel tending to stabilize the action of the engine and generally eliminating the necessity for a further flywheel, where their weight is adequate to meet the conditions of operation of the engine, and but a single shaft and cam is called for in the described construction to take care of the operation of all the parts of the device and the transmission of power therefrom.

As the explosive impact is applied to each piston in succession and simultaneously to pistons equi-distantly arranged around the cylinder, an even torque is obtained.

The problem of lubrication in an engine of the type described is obviously a simple one as practically the entire mechanism is enclosed in the chamber 7 to the upper end of which oil is pumped through the pipe 42 by the oil pump hereinbefore referred to, so that such lubricant will readily reach all parts of the mechanism within the said chamber, and, as far as the cylinders are concerned, although lubrication to the extent called for in engines such as reciprocating engines wherein considerable force is exerted by the pistons on the cylinder walls is not called for, it will be understood that the suction through the orifices in the rear of the head pistons and the hollow bolts connecting the head pistons to the head disk will provide an efficient lubrication of the cylinder. A pipe 90 extending from the lower part of the chamber 7 permits the escape of excess oil and also acts as a breather pipe cooperating with the breather means supplied by the tubular bolts 70 and the perforated rear ends of the head pistons in supplying air or oil vapor to the spaces between the head pistons and the power pistons behind said head pistons.

This invention may be developed within the scope of the following claims without departing from the essential features of the said invention, and it is desired that the specification and drawing be read as merely illustrative and not in a limiting sense, except as necessitated by the prior art.

What I claim is:—

1. In an internal combustion engine, a toroidal cylinder, a pair of disks rotatably mounted within the inner circumference of said cylinder, one of said disks having recesses, linkages joining said disks and mounted in said recesses, hollow pistons movably mounted in said cylinder, and hollow bolts joining said pistons to said disks and establishing communication between the interior of said pistons and said recesses.

2. In an internal combustion engine, a casting forming a chamber and a surrounding toroidal cylinder, a disk rotatably mounted in said chamber, hollow pistons movably mounted in said cylinder, hollow bolts joining said pistons to said disk and establishing communication between the interior of said pistons and said chamber, and a breather pipe communicating with said chamber.

3. In an internal combustion engine, a casting forming a chamber and a surrounding toroidal cylinder, a disk rotatably mounted in said chamber, hollow pistons movably mounted in said cylinder, said pistons being ported at their ends, hollow bolts joining said pistons to said disk and establishing communication between the interior of said pistons and said chamber, and a breather pipe communicating with said chamber.

In testimony whereof I affix my signature.

FRED G. THANNHAUSER.